United States Patent [19]

Masinter

[11] Patent Number: 5,742,807
[45] Date of Patent: Apr. 21, 1998

[54] INDEXING SYSTEM USING ONE-WAY HASH FOR DOCUMENT SERVICE

[75] Inventor: Larry M. Masinter, Los Altos, Calif.

[73] Assignee: Xerox Corporation, Stamford, Conn.

[21] Appl. No.: 455,605

[22] Filed: May 31, 1995

[51] Int. Cl.⁶ .................................................. G06F 17/30
[52] U.S. Cl. .................................................. 395/601; 380/25
[58] Field of Search .......................... 395/600, 650, 395/700, 800, 412, 421.06; 380/25, 23, 4; 364/962.1, 962.2, 963.3, 419.19

[56] References Cited

U.S. PATENT DOCUMENTS

| | | | |
|---|---|---|---|
| 4,625,076 | 11/1986 | Okamoto et al. | 178/22.11 |
| 4,807,182 | 2/1989 | Queen | 364/900 |
| 4,870,568 | 9/1989 | Kahle et al. | 364/700 |
| 5,136,647 | 8/1992 | Haber et al. | 380/49 |
| 5,189,700 | 2/1993 | Blanford | 380/23 |
| 5,231,666 | 7/1993 | Matyas | 380/25 |
| 5,241,673 | 8/1993 | Schelvis | 395/600 |
| 5,343,560 | 8/1994 | Takeda et al. | 395/166 |
| 5,479,654 | 12/1995 | Squibb | 395/600 |
| 5,544,051 | 8/1996 | Senn et al. | 364/419.19 |

OTHER PUBLICATIONS

Merkle, R., "A Fast Software One-Way Hash Function", *Journal of Cryptology* (1990) 3:43–58.

*Primary Examiner*—Thomas G. Black
*Assistant Examiner*—Ruay Lian Ho
*Attorney, Agent, or Firm*—Fay, Sharpe, Beall Fagan, Minnich & McKee

[57] ABSTRACT

Systems and methods for managing a plurality of electronically stored documents in an open document repository employ a one-way hash function to compute a hash for the stored documents as an indexing link. A document management index maps an attribute of an original document stored in the repository to the hash and the document. A hash-to-location index maps the hash to an address location of the document in a file system of the repository. The attribute points to the hash which then points to the location for linking the attribute to the location.

23 Claims, 3 Drawing Sheets

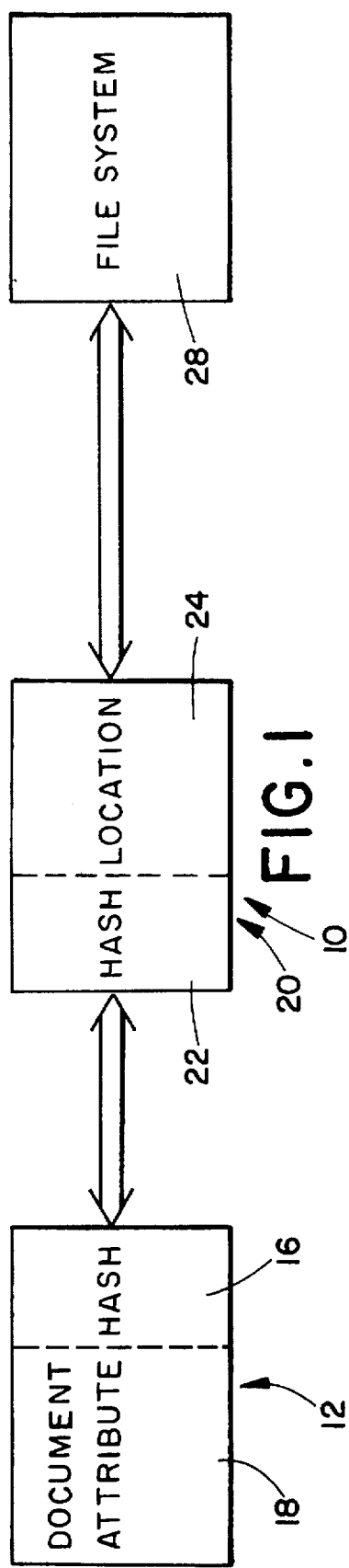
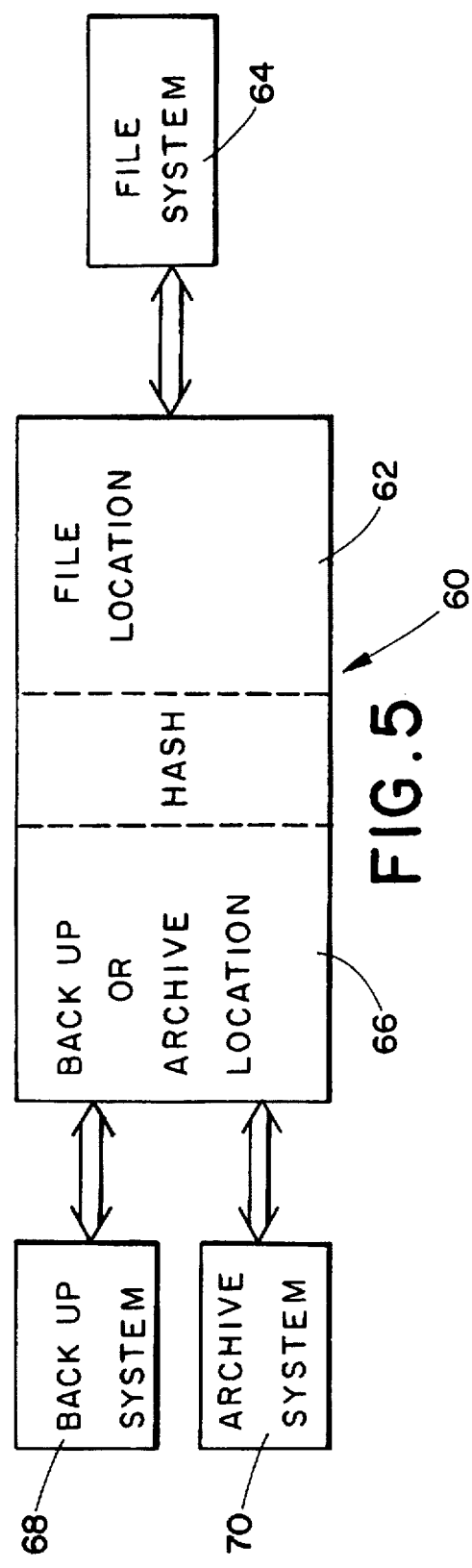

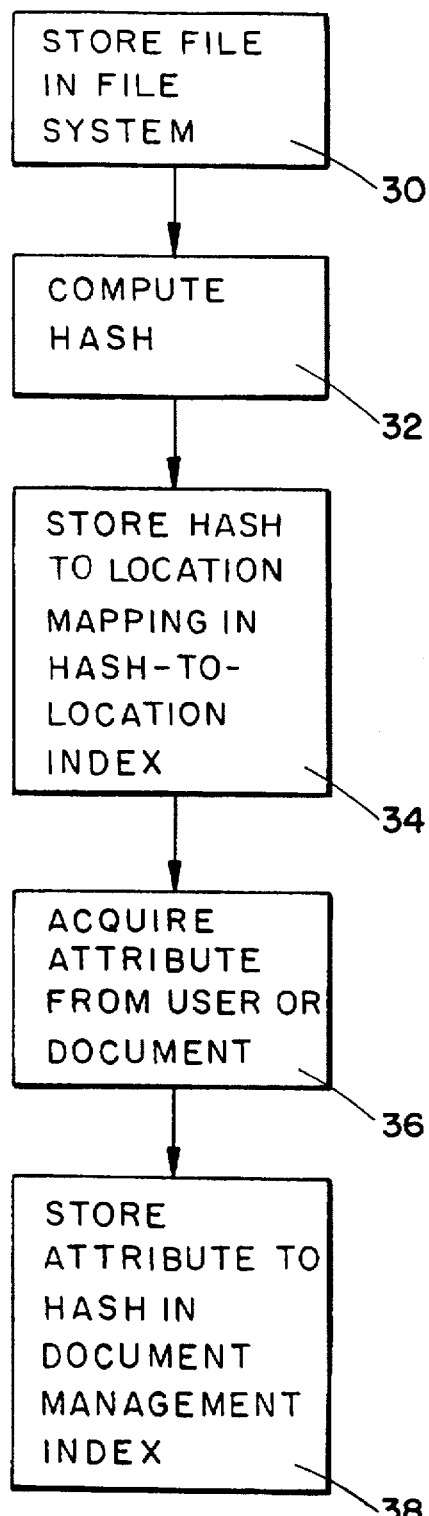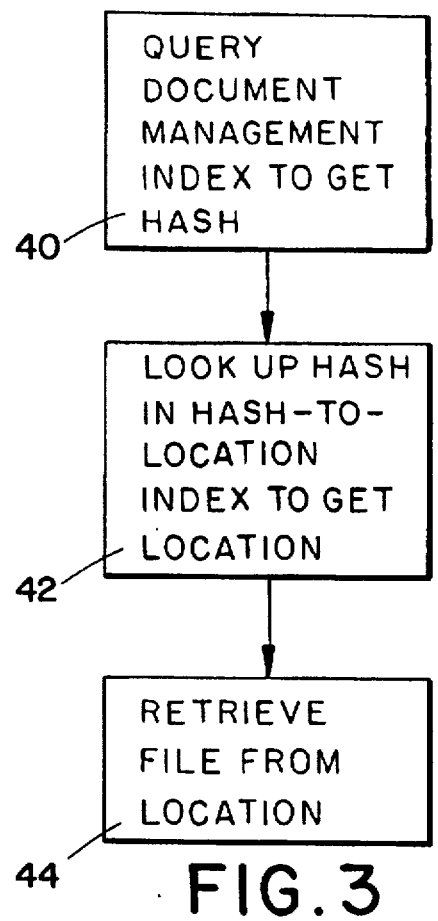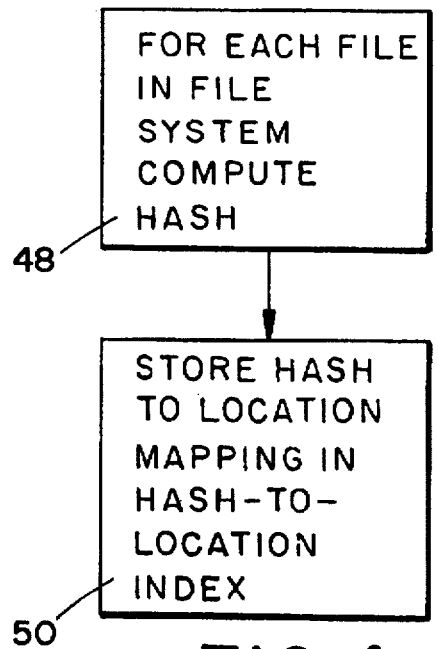

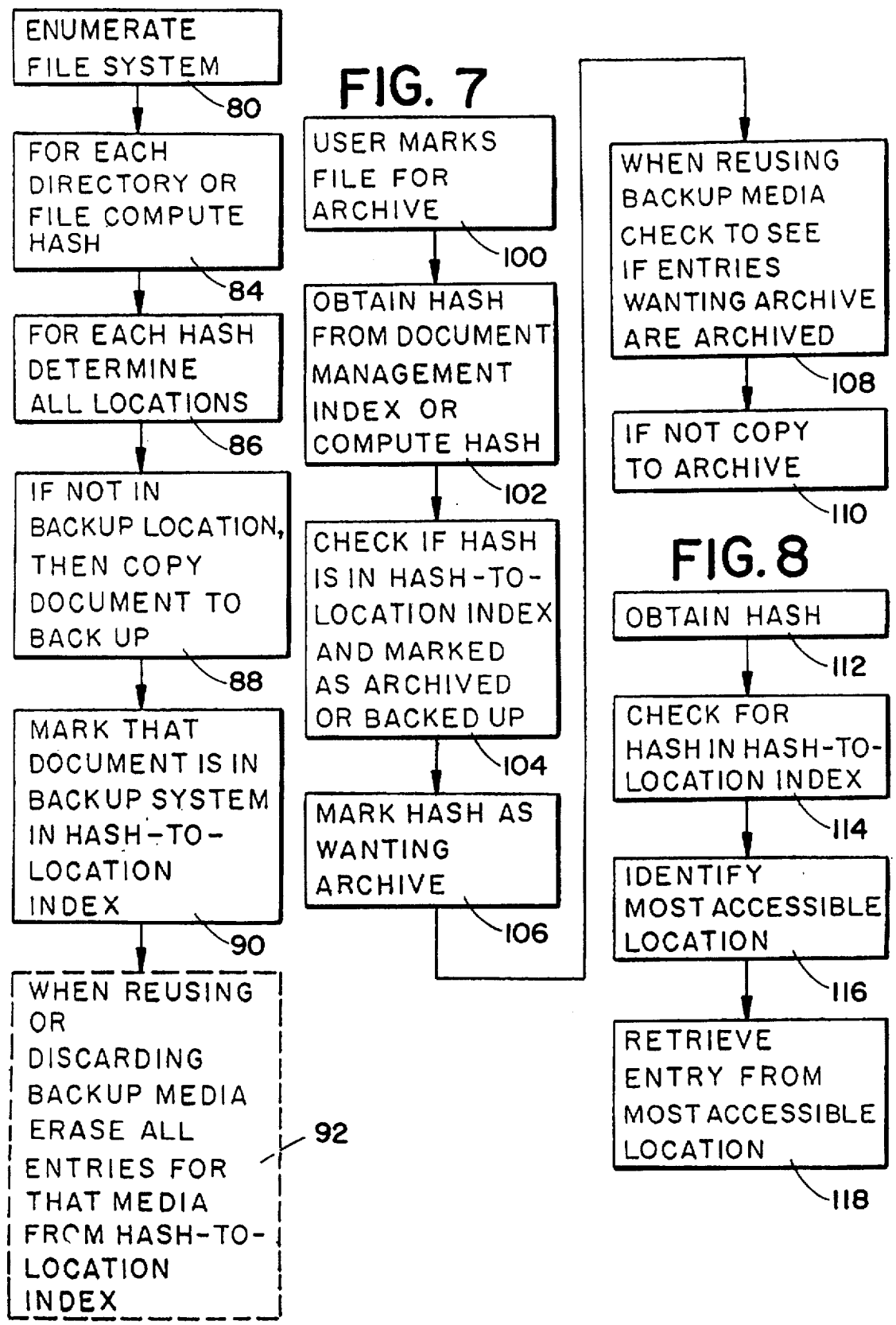

5,742,807

INDEXING SYSTEM USING ONE-WAY HASH FOR DOCUMENT SERVICE

BACKGROUND OF THE INVENTION

This invention pertains to the art of information processing systems and more particularly to document management systems for electronically stored documents.

The invention is particularly applicable to open document repositories for storing large numbers of documents and will be described with particular reference thereto. However, it will be appreciated that the invention has broader appreciations, such as systems which use various kinds of indexing schemes and may be advantageously employed in such other environments and applications.

There are many known types of indexing schemes for obtaining access to documents in a repository. Typically some particular attribute of a document will be employed as the key or pointer to the location of the document in the file system. However, as such repositories become more distributed and openly accessible through a network, the reliablity of the prior known document management systems has become highly suspect. For example, someone could access documents in the repository, modify them or move them without informing the repository index. The resulting losses in integrity of documents or the errors in the document management indexes may be unacceptable. Such problems can present a substantial quandary for document management groups charged with the responsibilities of maintaining a reliable open repository. Ideally, one would like to have the reliability and robustness of a closed document repository to assure the validity of the repository, but the enormous customer demand for an open document management system has presented a substantial need for a system which can accommodate wide-spread document access, while maintaining a reliable and valid index and repository. The particular problems with prior known systems have occurred in several ways.

When a storage element, such as a disk fails, the whole file system for that disk may need to be restored from a backup system. At restoration, all the pointers from the document management index for that system will point to the wrong address locations. They will point to where the sides were, rather than where they are at restoration. Accordingly, the entire document management index has to be completely redone.

For archive systems, it is important to guarantee that any document that is indexed in the repository will be available as long as the index is valid. For prior systems, the only way to do this was to copy every document to a different and separate archival repository. Typically, tape systems will be employed that could be stored off-site. The particular problem with such a system is that whenever a document was to be archived, then a copy had to be made immediately and the archive repository then could become as large as the original file space. The cost of maintaining such a large archive system is highly undesirable.

Another particular problem concerns controlling the access to documents for security reasons and to preclude undesired changes in the documents themselves. The competing interests between maintaining an open repository and yet imposing some capability based access scheme to limit access to the repository have been difficult to resolve. Prior known access control mechanisms have not proven to be sufficiently flexible to accommodate a large number of documents in the repository or a large user base. On the other hand, it is oftentimes necessary to completely preclude access to a document, i.e., to make the document unreadable. Many businesses have a requirement for an ability to be able to actually destroy all copies of some documents after a period of time. However, the presence of permanent document archives also makes this difficult.

The present invention contemplates a new and improved indexing scheme which overcomes all the above referred to problems and others to provide an open document management system that is flexible, reliable and robust, which is readily adaptable to a plurality of repository systems and indexing schemes and which provides improved access control and system integrity over prior known systems.

BRIEF SUMMARY OF THE INVENTION

The subject invention provides a method and system for making a link between a document index and an actual storage location of the document in a file system through one level of indirection, i.e., a hash-to-location table, where a mapping is made between the address location and a hash from a one-way hash function processing of the document. The documents typically are indexed by attribute or content. A document management index maps the attribute to the hash computed from the original document by the one-way hash function. The hash-to-location index then maps the hash to the address location. In other words, the hash functions as an intermediate link between the attribute and the address location. The hash can comprise a computation from a low probability hash function or a cryptographically secure hash function. The attribute comprises a user preselected attribute such as title, author, keyword or content note.

Several advantages result from the invention which all generally relate to providing improved reliability and security of repository access and operation such as may be expected in a "closed" repository, but now are also available in an "open" repository. In particular, moving and restoring documents from backup can be done without invalidating the document management index. The host-to-location index can be updated by either an explicit user action or a background scanning process.

Another advantage is the provision of capability based access control to particular documents by either the one-way hash of the original document, or a variation computed by hashing the document with some standard prefix attached, thus more simply enabling a variety of access control regimes.

Yet another advantage is that a smaller document archive can be achieved by using the backup system of the file system as a safeguard. That is, a background process, explicit user action, or an action at time of reuse of backup tapes can detect those documents that are indexed but are no longer available on disk, and restore them from backup into a separate archive.

Yet another advantage is the capability to secure a time stamp for documents merely by using one-way hash functions as a document key and generating them regularly.

Still another advantage of the invention relates to the destruction of documents by effectively making the documents unreadable by encrypting access to the document with its one-way hash. Thus, to "destroy" a document, the operator need only erase the one-way hash key.

Another important advantage of the invention is that it can provide an indexing system using a one-way hash for backup/archive document service in a distributed file system where a plurality of processing units have a plurality of files for selective backup or archive. The plurality of files are intended for communication to a storage in the backup/ archive document service. The system includes a means for computing one-way hash for any of the files and for determining if the one-way hash is already included in the backup/archive document service and if not, the file is stored and the hash is recorded, but if the file is already included in the service, then the system can move onto the next of the files.

Alternatively, a directory of one-way hashes can be compiled with means for computing a hash or hashes of the directory, wherein the hash or hashes can also be stored in the backup/archive document service.

Yet another advantage of the system is implementing it for synchronizing files between first and second processing units for replicating files therebetween. In particular, such a method would designate a first processing unit as a file repository having a plurality of files and a second processing unit as a backup service to the file repository. The second processing unit would compute the one-way hash of any of the files in the first repository and determine if the one-way hash is stored therein and if not, record the hash and the file in the second processing unit. If already included, as above, the backup service can move to the next file.

In accordance with a more limited aspect of the present invention, the first processing unit can compute a one-way hash of a directory of files or directories or a hash of the hashes of the directories, recursively.

Still other advantages and benefits of the invention will become apparent to those skilled in the art upon a reading and understanding of the following detailed description.

BRIEF DESCRIPTION OF THE DRAWINGS

The invention may take physical form in certain parts and steps, and arrangements of parts and steps. The preferred embodiments of which will be described in detail in the specification and illustrated in the accompanying drawings which form a part hereof, and wherein:

FIG. 1 is a block diagram of a document management system formed in accordance with the present invention;

FIG. 2 is a flow chart showing the steps a user would take to save a file in the document management system of FIG. 1;

FIG. 3 is a flow chart illustrating the steps for retrieving a file from the system of FIG. 1;

FIG. 4 is a flow chart for a validating process for the entries in the hatch location index of FIG. 1;

FIG. 5 is a block diagram of an archive and backup system implemented in accordance with the document management system of FIG. 1;

FIG. 6 is a flow chart illustrating the steps of a backup process for a single work station in accordance with the system of FIG. 5;

FIG. 7 is a flow chart illustrating the steps of an archive process of the system of FIG. 5; and FIG. 8 is a flow chart illustrating the steps of retrieval from archive for the system of FIG. 5.

DETAILED DESCRIPTION OF THE INVENTION

Referring now to the drawings where the showings are for purposes of illustrating the preferred embodiments of the invention only, and not for purposes of limiting same, FIG. 1 shows a document management system 10 intended for use as an open document repository for electronically storing a plurality of documents. Typically, a user will access a document management client (not shown) which will in turn access the system 10. The document management system 10 is comprised of three components; a document management index 12, a hash-to-location index 20 and a file system 28. The central processing unit 18 controls the data communication through these elements. The document management index 12 comprises a primary table including a mapping between an attribute of an original document stored in the repository and a hash 16 computed from that original document. Specifically, the hash 16 is obtained by using a one-way hash function. Such hash functions are well known and can either comprise a low probability hash function or cryptographically secure hash function. All such functions have the ability to accept an arbitrarily large input and produce a small, fixed sized output. Accordingly, random sized documents can be processed by the one-way hash function to generate an associated hash in the index table 12 so the particular attribute can be uniquely associated with the corresponding document hash. A good general discussion of such one-way hash functions is contained in Merkle, *A Fast Software One-Way Hash Function*, Journal of Cryptology 3:43–58 (1990).

A secondary table 20 comprises the hash-to-location index including a mapping between a hash 22 and an address location 24. The address location 24 comprises the location of the document as it is electronically stored in the file system 28. For any particular document that is stored in the file system 28, the hash of that document will be identical in the document management index and the hash location index. Accordingly, when the document is identifiled by the document attribute 14, the hash associated with that attribute will point to the same hash in the hash-to-location index and the associated location with that hash will then point to the resident location of the document in the file system 28. The hash thus functions as a document key which makes the link between the document index and actual storage location pass through one level of indirection, i.e., the hash-to-location index table 20, where the appropriate look-up is performed for the location of the document.

FIG. 2 comprises a flow chart for storing a document in the system of FIG. 1. At step 30 the user will store the document at a particular location in the file system 28. Storage is accomplished in a conventional data processing manner by the central processing unit 18. The processing unit 18 will also include a program for computing the hash at step 32 from a preselected one-way hash function. The hash and location are next stored at step 34 in the hash-to-location index 20 to comprise the mapping from the hash 22 to the location 24 for that particular document. The document management index 20 must next acquire a particular identifying attribute from the user or the document itself at step 36, then finally at step 38 the appropriate mapping in the index between the attribute and the hash 16 is stored in the index 12. Typically, the attribute will comprise something as simple as a title, author or keyword of the original document, although there is no limitation on the form of the attribute. Accordingly, after implementation of this process, the indices 12 and 20 sequentially link the attribute of the document to its hash and to a location in the file system 28 where the document is stored. The steps of storage in the respective indices can be done in parallel or in reverse order from what has been described above.

FIG. 3 describes the retrieval of the document from the system 10. At step 40, a user will query the document management index to get the particular hash for the desired document. At step 42, the selected hash is identifiled to look-up the desired location in the hash-to-location index 20 and at step 44, the document can then be retrieved from the selected location.

FIG. 4 shows the process steps for validating the hash-to-location index 20 (FIG. 1). Step 48 comprises computing the hash for each file in the file system 28 and step 50 involves storing the hash-to-location mapping in the hash-to-location index 20. Such validation can preferably occur when making back-ups of the files in the file system.

In the present invention, the validation process is easy and convenient to perform which is particularly important when the documents in the file system 26 are moved. For example, if someone were to move a document from one place to another, it is easy to locate the hash from the hash-to-location index. Either an explicit user action or a background scanning process can compute the one-way hash of all the files of the file system, or merely a sub-set of them, and then look-up the hashes in the hash-to-location table and update the associated locations in the table. Thus, in accordance with the invention, moving files, restoring them from backup or similar actions will not invalidate the document management index 12.

Another advantage of the subject invention is the ability to impose improved capability-based access for the documents in the system. One of the features of an open document management system is that it relies on the underlying file system for security and access control. However, as noted above, the access control mechanisms of some file systems are not particularly flexible. The subject invention makes it possible to use the one-way hash of a document (either the original hash, or a variation computed by hashing the document with some standard prefix attached) as the capability for access to the particular document. The user can declare that he is willing to give out copies of any document given the capability for accessing it. This capability access control can interact with the document in the process in a way to give a broad range of document access control regimes with substantial advantages in document and user authentication.

Other advantages which flow from the system relate to time stamping the documents where, by using a one-way hash function as a document key and generating them regularly, it is easy to regularly generate secure time stamps for the documents. Also, the ability to apply digital signatures to each of the documents in the file system is enhanced. Lastly, effective document "destruction" can occur by destroying access to the hash. Without some means of acquiring the hash, the document location is forever lost.

With reference to FIG. 5, the subject invention is illustrated for implementation with a backup or archive system. In particular, a modified hash-to-location index 60 which not only includes the mapping to the file location 62 of the document in the file system 64, but also includes a hash to backup or archive location 66 for a backup system 68 or an archive system 70. The subject invention provides a substantial advantage in reduction in storage size or band width of document archive space. As explained above, when it is necessary to guarantee that any document that was indexed will be available as long as the index is valid, the prior art required copying every document to a separate archive repository in order to ensure that it would always be available. Unfortunately, the resulting repository is as large as the original file space. The subject invention makes it possible to use the backup system 68 of the file system as a safeguard. For example, in either a background process, an explicit user action, or an action at time of reuse of backup tapes, the system can notice those documents that are indexed but no longer available on a disk, and restore them from backup into a separate archive 70. The archive 70, need not be as big as all documents indexed, but only those indexed but no longer available in the file system 64.

FIG. 6 is a flow chart of the steps of a model backup process for a single workstation. The first step 80 comprises identifying a particular file system to be backed-up. For each directory or file in the file system, a selected one-way hash function is used to compute an associated hash 84. At step 86 for each computed hash, all locations of the associated document are determined, whether in the file system 64, the backup system 68 or the archive system 70. At step 88, if the particular document is determined not to be in the backup system 68, then the document is copied and stored in the backup system 68. At step 90, the hash-to-location index 60 is marked that the particular document is stored in the backup system by the mapping between the associated hash and the backup or archive location 66.

Step 92 is an optional step which is advantageous when reusing or discarding backup media. Typically, backup media will be tape that can be stored for a limited period of time and that can be reused. At step 92 all entries on the backup media being discarded or reused are erased from the hash-to-location index 60. This last step provides the economy of storage space available with the subject invention. For example, for a file that is no longer in the file system 64, but is stored in the backup system 68, the hash to file location map 62 and the hash to backup location 66 can both be erased. However, if the file is desired to be stored in a separate archive system 70, the hash-to-location index can still retain a mapping between the hash and an archive location 66.

FIG. 7 shows the process for archiving documents. At step 100, a user will mark a particular file for archiving. At step 102, the hash for the marked file is obtained from the document management index, or if not stored therein, the hash can be computed. At step 104, the hash-to-location index is then checked to see if the obtained hash is stored therein, and if so, the hash is marked as wanting archive at step 106. Step 108 involves checking the entries in the backup system so that when reusing discarded backup media, the entries in that media are checked to see if a particular file wanting archive was properly archived into the archive system 70. If not, then at step 110 the appropriate file is read-off the backup media and copied to the archive system 70.

The subject invention thus provides a substantial advantage in backup of distributed file systems with replication. In the context of backing-up a distributed file system, even outside of the context of a document storage and retrieval system, it is possible to not back-up most of the data. Rather, each system need only compute the one-way hash of the file on its disk (file system), and compare the hash against an archive service to decide whether the data associated with the particular hash needs to be sent off-line for backup.

FIG. 8 shows the advantages of retrieval from archive for a capability-based access system like the subject invention. For file retrieval from archive, at step 112 the associated hash is obtained for the document management index or other source. In step 114 a check is made for the hash in the hash-to-location index 60, since the hash-to-location index can identify several locations in either the file system 64, the backup system 68 or the archive system 70 for a document represented by a particular hash. At step 116, the most accessible location for retrieving the document is identified and at step 118, the document is retrieved therefrom.

Accordingly, the advantage provided is that by using a one-way hash function, it is not necessary for any other processor access control or authorization. The retrieval process becomes more simple.

The invention has been described with reference to the preferred embodiments. Obviously, modifications and alterations will occur to others upon the reading and understanding of this specification. It is my intention to include all such modifications and alterations insofar as they come within the scope of the appended claims or the equivalents thereof.

Having thus described my invention. I now claim:

1. An open document repository for electronically storing a plurality of documents comprising:
   a file system for electronically storing an original document at an address location;
   a document management index comprising a mapping between an attribute of the original document stored in the repository and a hash computed from the original document; and
   a hash-to-location index interposed as a key link between the document management index and the file system comprising a mapping between the hash and the address location of the original document in the file system whereby the attribute points to the hash which points to the location for linking the attribute to the location for the documents stored in the repository.

2. The repository as defined in claim 1 wherein the hash comprises a computation from a low probability hash function.

3. The repository as defined in claim 1 wherein the hash comprises a computation from a cryptographically secure hash function.

4. The repository as defined in claim 1 wherein the attribute comprises a user preselected attribute of the original document.

5. The repository as defined in claim 4 wherein the attribute comprises one from a group of title, author and keyword of the original document.

6. The repository as defined in claim 1 wherein the hash-to-location index includes means for linking the hash to a backup system.

7. The repository as defined in claim 1 wherein the hash-to-location index includes means for linking the hash to an archive system.

8. The repository as defined in claim 1 further including means for validating a particular hash associated with a particular location in the hash-to-location index.

9. A document management system for electronically storing a document in a file system comprising:
   index means interposed between a management index and the file system for sequentially linking a preselected attribute of the document to a hash computed from the document to a location in the file system where the document is stored.

10. The document management system as claimed in claim 9 wherein the hash is computed from either a low probability hash function or a cryptographically secure hash function.

11. The document management system as claimed in claim 9 wherein the attribute comprises a user selected feature of the document suggestive of an identity of the document.

12. In an open document repository containing a plurality of documents, a method of indexing each of the plurality for archival document service comprising steps of:
   identifying an attribute of one of the plurality of documents to be electronically stored in the repository;
   computing a hash of the one document;
   mapping the hash to the attribute in a document management index;
   identifying an address location of the one document in a file system of the repository; and,
   mapping the address location to the hash in a hash-to-location index wherein the hash-to-location is disposed as a security key link between the document management index and the file system and whereby the attribute is used to point to the location through the indexes.

13. A document management method for a document repository containing a plurality of documents in a file system of the repository comprising steps of:
   storing an original document in the file system at a location;
   computing a hash of the document using a one-way hash function;
   storing the hash and the location as an associated mapping in a hash to location index disposed as a security link for an entrance to the file system;
   acquiring an attribute of the document; and,
   storing the attribute and the hash in a document management index whereby the attribute points to the hash and the hash points to the location for selective access of the document from the file system.

14. The document management method as claimed in claim 13 further comprising steps for retrieval of the document of:
   querying the document management index to identify the hash for the document;
   using the hash to identify the location from the hash to location index; and,
   retrieving the document from the location.

15. The document management method as claimed in claim 13, wherein a back up system is also provided and further comprising steps for backup of the repository of:
   identifying a particular file system of the repository;
   for each directory or file in the particular file system computing a representative hash from the one way hash function;
   for each computed representative hash, determining all locations for said each directory or file in the back up and file systems from the hash to location index;
   copying said each directory or file to the back up system determined not to be at a back up location; and,
   marking the hash to location index to indicate that the copied directory or files are in the back up system.

16. The document management method as claimed in claim 15 further comprising, when reusing or discarding backup media, identifying and erasing all entries for the media from the hash to location index.

17. The document management method as claimed in claim 15, wherein an archive system is also provided and further comprising steps for archiving of the repository of:
   marking one file for archive;
   obtaining a hash for the one file;
   determining if the hash is in the hash to location index and if the hash is marked as archived or backed up;
   marking the hash as wanting archive in the hash to location index.

18. The document management method as claimed in claim 17 further comprising steps of retrieval of the original document of:

obtaining the hash;

identifying a most accessible location of the document from the hash to location index; and, retrieving the document from said most accessible location.

19. The document management method as claimed in claim 17 further comprising when reusing backup media, checking if any entry on the backup media that is marked as wanting backup in the hash to location index is actually archived, and if not, copying said entry to archive.

20. An indexing system using a one-way hash for backup/archive document service in a distributed file system including a plurality of processing units each having a plurality of files for selective backup or archive, wherein the plurality of files are intended for communication to and storage in the backup/archive document service, comprising:

means for computing the one-way hash for a one of the files in a one of the processing units; and, means for determining if said one-way hash is already included in the backup/archive document service and if not, storing the one file and recording said one-way hash in the backup/archive document service, and if already included, computing another one-way hash for another of the files.

21. The indexing system as defined in claim 20 including a directory of one-way hashes respectively associated with a plurality of files wherein said one processing unit includes means for computing a hash-of-hashes of said directory recursively, and means for storing said hash-of-hashes in the backup/archive document service.

22. A method for synchronizing files between first and second processing units and for replicating files therebetween, comprising:

designating the first processing unit as a file repository having a plurality of files;

designating the second processing unit as a backup service to the file repository;

computing by the second processing unit of a one-way hash of a one of the files in the first repository; and, determining if said one-way hash is already stored in the second processing unit, and if not, storing the one file and recording the one-way hash in the second processing unit, and if already included, calling another of the files of the first processing unit for said computing and determining.

23. The method as defined in claim 22 wherein said first processing unit includes a directory of the files stored therein and said second processing unit further selectively computes an other one-way hash of said directory or a directory of files and directories, or a hash-of-hashes of said directory, recursively.

* * * * *